US008567688B2

(12) United States Patent
Weisenberger et al.

(10) Patent No.: US 8,567,688 B2
(45) Date of Patent: Oct. 29, 2013

(54) MOISTURE REDUCTION AND MOLD AND MOISTURE DAMAGE PREVENTATIVE SYSTEM AND METHOD IN CONSTRUCTION

(76) Inventors: Andrew R. Weisenberger, Milwaukie, OR (US); Robert A. Weisenberger, West Linn, OR (US)

( * ) Notice: Subject to any disclaimer, the term of this patent is extended or adjusted under 35 U.S.C. 154(b) by 304 days.

(21) Appl. No.: 10/621,859

(22) Filed: Jul. 16, 2003

(65) Prior Publication Data

US 2005/0011962 A1 Jan. 20, 2005

(51) Int. Cl.

*F24F 3/14* (2006.01)
*G01F 3/02* (2006.01)
*F25B 49/00* (2006.01)

(52) U.S. Cl.

USPC ........................ 236/44 A; 236/44 R; 62/176.1

(58) Field of Classification Search

USPC ........... 236/44 A, 44 R; 62/176.1, 176.5, 150
See application file for complete search history.

(56) References Cited

U.S. PATENT DOCUMENTS

| | | | | |
|---|---|---|---|---|
| 4,775,944 A | | 10/1988 | Nakamura | |
| 5,004,483 A | * | 4/1991 | Eller et al. | 95/10 |
| 5,212,958 A | * | 5/1993 | Anderson | 62/150 |
| 5,259,553 A | | 11/1993 | Shyu | |
| 5,992,161 A | * | 11/1999 | O'Halloran et al. | 62/90 |
| 6,340,892 B1 | | 1/2002 | Rynhart et al. | |
| 6,402,613 B1 | * | 6/2002 | Teagle | 454/195 |
| 6,705,939 B2 | | 3/2004 | Roff | |
| 2003/0040934 A1 | | 2/2003 | Skidmore et al. | |
| 2004/0190586 A1 | | 9/2004 | Lee et al. | |

FOREIGN PATENT DOCUMENTS

JP 2002317560 A 10/2002

OTHER PUBLICATIONS

Solutions—Munters Keeps Construction Projects on Schedule! Munters 2000/2001.*
Preventing Mold by Keeping New Construction Dry. Harriman, Schnell & Fowler, p. 28-34, ASHRAE Journal, Sep. 2002.*
Preventing Mold by Keeping New Construction Dry. Harriman, Schnell $ Fowler, presented at the 2001 ASHRAE IAQ seminar, 2001.*
Construction Drying, Munters Oct. 2000.*
Using Desiccant Technology to End Moisture Nightmare on Construction Projects, Munters, Feb. 21, 2002.*
Willis, "Creating a Little Desert Indoors—Dehumidifiers speed up finish work inside NW buildings", Jun. 1, 2000, Daily Journal of Commerce.*
Munters, "Case Study—Construction Drying: Mold and Mildew Protection Project Yields Multiple Benefits Round Rock, Texas", Mar. 2002.*
Harriman et al., "Preventing Mold by Keeping New Construction Dry", ASHRAE Meeting, Jan. 2003, Chicago, IL.*
Archive Press Release, "Munters New HCU Product Allows Dehumidity Control Independently of Temperature Control", http:/News.thomasnet.com/fullstory/7783, Mar. 8, 2002.*

(Continued)

*Primary Examiner* — Chen Wen Jiang
(74) *Attorney, Agent, or Firm* — Stolowitz Ford Cowger LLP

(57) ABSTRACT

A moisture removal system and method employing air movers, dehumidifiers, heaters and attendant methods for reducing moisture in a construction project. The method and system include operating moisture removal equipment and testing moisture content levels sufficient to reduce the moisture content levels to a desired threshold to reduce the likelihood of mold growing or moisture damage in the construction after it is completed.

2 Claims, 1 Drawing Sheet

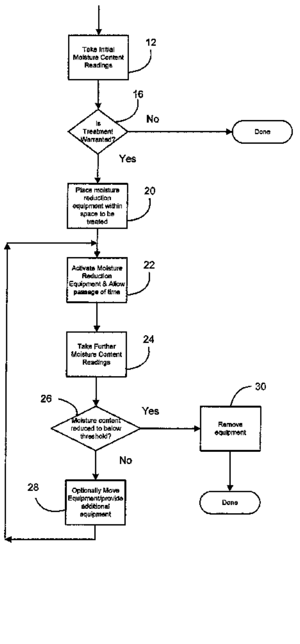

(56) References Cited

OTHER PUBLICATIONS

Moisture Intrusion and Inspection, 2 pages, from www.residentialinspections.com, copyright 2001, Residential Inspections LLC. Publication date unknown.
Mold in Your Home, 6 pages, from www.residentialinspections.com, copyright 2001, Residential Inspections LLC. Publication date unknown.
“Wood Moisture Content”, from Clemson Extension Residential Housing, HL 255, Rev. Apr. 1997.
Moisture Testing Guide for Wood Frame Construction Clad With Exterior Insulation and Finish Systems (EIFS):, 31 pages, from www.toolbase.org/Docs/MainNav/MoistureandLeaks/876_protocol5A.pdf?TrackID=&CategoryID=1013&DocumentID=876, Aug. 4, 1998.
“Testing Housing Materials for Moisture”, 2 pages, from www.extension.umn.edu/info-u/household/BK270.html, Copyright 1998.
Data and brochure sheets for the Quest Technologies Indoor Air Quality Monitors models aq-5000 and aq-5001. A brief summary of the devices can be found at the following web site addresses: http://www.quest-technologies.com/AQ/aq5000.htm and http://www.quest-technologies.com/IAQ/aq5001.htm.
ASTM, (1998), D4444-92e1 standard test methods for use and calibration of hand-held moisture meters, American society for Testing and Materials; abstract obtained from http://alcor.concordia.ca/~raojw/crd/reference/reference000784.html.
“Indoor Air Quality Monitors”, Quest Technologies PDF Brochure for Model AQ 5000 Hand Held IAQ Monitor and Model AQ 5001 Portable IAQ Monitor, Rev. A Apr. 2000.
Decision on Appeal mailed Apr. 25, 2012 in related U.S. Appl. No. 10/621,860, filed Apr. 25, 2012.

* cited by examiner

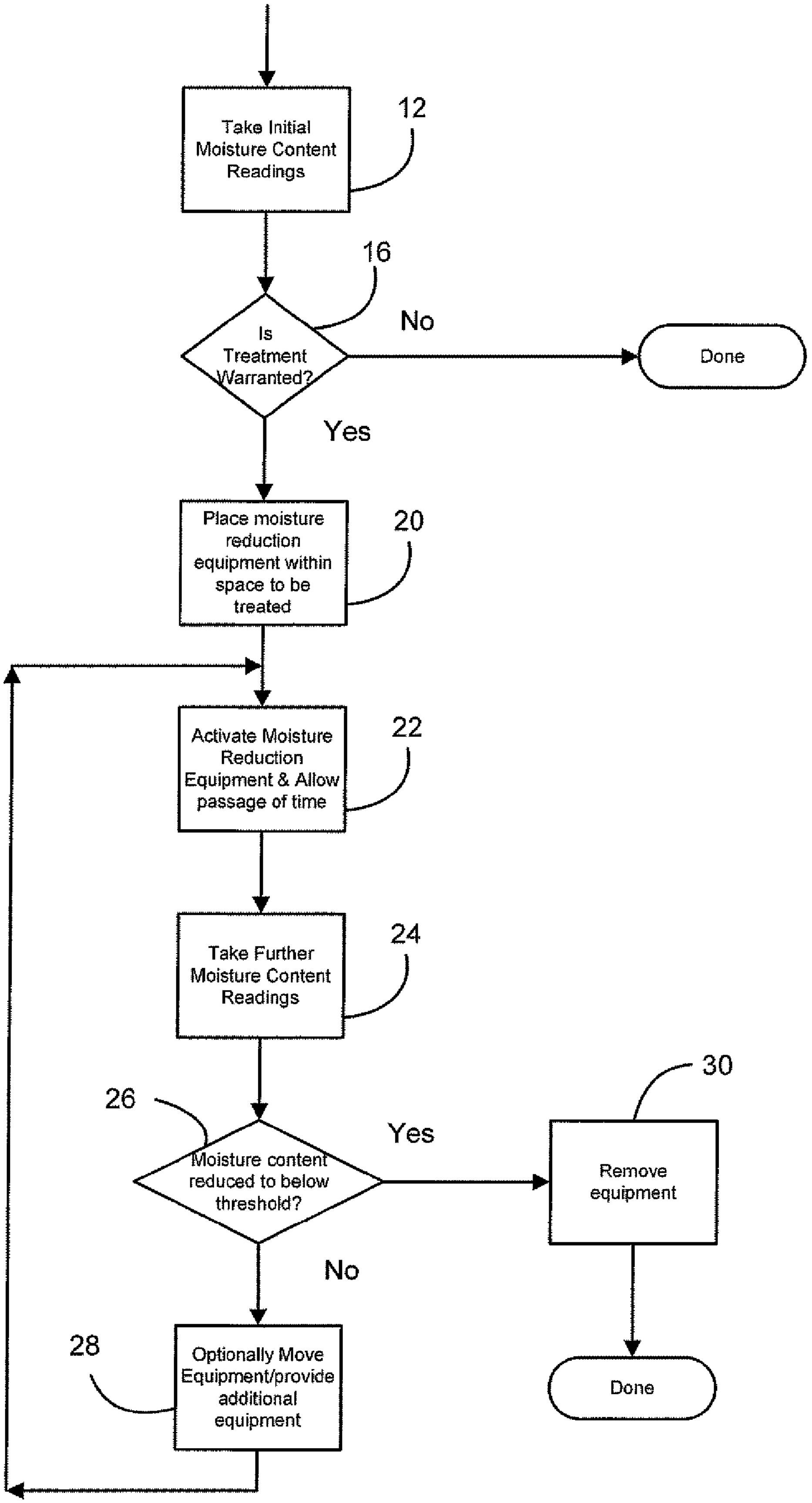
Take Initial Moisture Content Readings
12
16
Is Treatment Warranted?
No
Done
Yes
Place moisture reduction equipment within space to be treated
20
Activate Moisture Reduction Equipment & Allow passage of time
22
Take Further Moisture Content Readings
24
26
Moisture content reduced to below threshold?
Yes
30
Remove equipment
No
Done
28
Optionally Move Equipment/provide additional equipment

MOISTURE REDUCTION AND MOLD AND MOISTURE DAMAGE PREVENTATIVE SYSTEM AND METHOD IN CONSTRUCTION

BACKGROUND OF THE INVENTION

This invention relates to buildings and construction, and more particularly to controlling moisture to reduce the likelihood of mold growth and moisture damage.

Mold and mildew problems in buildings are becoming more common, and can lead to substantial remediation efforts, with associated costs or litigation.

In building construction, whether commercial or single or multiple family residential, problems can arise if a particular level of moisture remains in walls at the time the walls are sealed. During construction, these buildings are typically wet, either from rain/snow or from wet construction materials being used, for example, wet wood, or materials that are applied in a wet state and then need to dry. Mold will typically grow in wood or other construction material when there is sufficient moisture present, for example, above 20% moisture in Douglas fir.

Mold spores can grow if sufficient moisture is sealed into construction material and there is an available food source. Should mold develop, it is often detected immediately, or sometimes such detection is delayed. In some cases, it is never detected.

Mold remediation, such as removal and prevention of future growth, is costly and time consuming. The existence of mold in a construction project can cause public relations issues, wherein the builder or project developer can be equated with the bad publicity related to the mold issues. Still further, legal issues can arise, related to the costs and delay of remediation, alleged health issues from occupants of the affected buildings, and contractual disputes arising over purchase or lease of the affected property, as a purchaser might wish to cancel a property transaction based on the mold issues.

Apart from mold issues, the presence of moisture alone can also lead to damage to structures and materials, resulting in costly remediation with corresponding issues to those noted hereinabove with respect to mold.

Financing and monetary requirements demand that structures be built as quickly as possible, to minimize the duration of construction financing, for example, and to increase construction-related revenue. Such time constraints result in framing being covered up as quickly as possible. These time constraints do not allow a builder to have a partially completed structure sit for weeks to allow any moisture in the construction materials to naturally reach equilibrium with its environment, and this increases the likelihood that wet materials may be sealed up, leading to a higher likelihood of mold growth or moisture damage occurring. Depending on climate factors, the business cycle of construction may not allow sufficient time for waiting for the natural drying process.

In particular in new construction, building practices resulting in an energy efficient structure may severely restrict airflow between the interior and exterior of a structure, resulting in trapping of moisture inside the structure. This can increase the likelihood of mold or moisture problems in structures today.

Heretofore, the issue of mold has been addressed as an afterthought in reactive fashion, only being tackled when mold appears, advising cleaning up mold quickly when it appears, for example.

SUMMARY OF THE INVENTION

In accordance with the invention, a system and method is provided for removing moisture from a construction project, to ensure sufficiently low moisture content is present in the construction before it is sealed.

Accordingly, it is an object of the present invention to provide an improved method for reducing moisture in construction projects below a desired level.

It is a further object of the present invention to provide an improved system for removing moisture from construction projects.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 1 is a block diagram of the process according to the present invention.

DETAILED DESCRIPTION

The system according to a preferred embodiment of the present invention comprises a system and method for reducing moisture content in a building or portion of a building under construction, wherein said reduction is made as a curative and preventative measure that takes place at a specific phase in the construction process.

Referring now to FIG. 1, which is a block diagram of the moisture reduction process according to the present invention, the system and method are typically employed, in the case of construction, after the roof, windows and doors are installed and before the so called finish trades (wall board, insulation, cabinetry, etc.) are done. When a decision to take the preventative measure has been made, initial readings of moisture content of construction materials, relative humidity and temperature are taken in the building under test (step 12). These measurements are made to determine how to effect moisture removal in the building and may be made, for example, with a GE Protimeter MMS Plus model by GE Protimeter, 500 Research Drive, Wilmington, Mass., US, or the Tramex Moisture Meter, from Tramex Ltd. of Dublin, Ireland moisture meter in particular embodiments.

Next, in step 16, a determination is made based on the results of the readings, whether preventative moisture removal is warranted. For example, if moisture content of Douglas fir is below 20% moisture content, moisture removal treatment may not be needed. If further treatment is not needed, then the process is complete at block 18. However, if further treatment is deemed advisable, then the process continues to block 20, wherein moisture reduction equipment is placed within the space that is to be treated. The specific moisture reduction equipment employed can vary based on the moisture removal needs of the structure, but typically will include air moving equipment, such as blowers, for circulating the air within the space, dehumidifiers to extract the moisture from the air and either contain it within the dehumidifier or dispose of it external to the space (by a drain tube, for example). Additionally, heating equipment may be employed, to raise the temperature within the space to increase the speed of moisture removal.

Examples of typical equipment that may be employed in the system and performing the method is as follows:

Blower: An electric portable blower that provides a continuous, high velocity airflow, such as model #797 Ace TurboDryer, from Dri-Eaz of Burlington, Wash., US, or the Dri-Eaz Santana SX model turbodryer, or the Gale Force air mover by Dry Air Technology of Burlington, Wash.

Dehumidifier: #721 DrizAir 1200, by Dri-Eaz of Burlington, Wash., US. This is a refrigerant dehumidifier which provides a 15 gallon per day maximum moisture removal output level, while drawing 6.4 amps current at 120V. Also, the DrizAir 2000, a 25 gallon per day model can be employed. Alternatively, a DriTec desiccant dehumidifier may be employed, which uses silica gel to adsorb moisture from the air, manufactured by Dri-Eaz of Burlington, Wash.

Heater: portable heaters, such as propane/natural gas powered heaters, such as the Dri-Eaz K85 mobile furnace, by Dri-Eaz of Burlington, Wash., US.

In a typical installation, four or five blowers or fans will be grouped together with one dehumidifier and heater in a given space.

Depending on the particular characteristics of the space being treated, openings into other rooms or other parts of a building are sealed off with some sort of vapor barrier (for example, plastic sheeting in roll form and duct tape to seal the sheeting to close off the opening). Also, window or door openings that do not yet have the windows or doors installed may be sealed in corresponding fashion.

Once the equipment is in place, the blowers and dehumidifier are activated (and heaters, if present) and they are allowed to run for a period of time (block 22), typically a 24 hour period, whereupon further moisture readings are taken (block 24) to track the progress of moisture removal. At decision block 26, a determination is made whether sufficient moisture has been removed from the space. If not, then the equipment is allowed to continue to operate. Optionally, the equipment may be moved around to different locations within the space being treated (block 28). The process loops back to allow the passage of time at block 22, and the time/readings/determine whether acceptable moisture content reduction has occurred cycle continues until the result of the decision block 26 is that yes, the moisture content has been reduced to an acceptable level (for example, 20% or lower moisture content). Then the moisture removal process is completed and the equipment is removed (block 30).

A typical time between the initial placement of the equipment and determination that the space has a sufficiently low moisture content level is 4 to 7 days. Of course this depends on a number of factors, including the initial moisture content of the space, the capacity of the moisture control equipment that is installed, and relative humidity and temperature, for example.

Some other possible variations in the process can occur. For example, if at block 24, when further readings are taken after the passage of time, it is determined that the moisture level is not being reduced (or is not being reduced at a sufficient rate), then additional blower/dehumidifier/heating equipment may be added. Further, if after a passage of time, the moisture levels are not reducing in a desired fashion, this typically indicates that moisture is leaking into the space from an outside source (for example an improperly installed roof is leaking) and investigation of the source of the moisture should be made.

Examples of application of the system and method are given below. The measurement goal for all tests in these particular examples is 18% moisture content:

EXAMPLE 1

New construction, 1500 square feet.

Day 1, temperature 71.5° F., 36.7% relative humidity. 2 measurements were taken low along wall studs, giving 16 and 18% moisture content. 4 measurements were taken high along wall studs, giving 16, 24, 21 and 21%.

Moisture removal equipment was installed and allowed to run for the rest of day 1. On day 2, temperature was 64.7° F., 46.9% relative humidity. 2 measurements were taken low along wall studs, giving 16 and 18% moisture content. 4 measurements were taken high along wall studs, giving 16, 18, 18 and 18% moisture content. The moisture removal operation was judged completed.

EXAMPLE 2

New construction, 2200 square feet.

Day 1, temperature 69.4° F., 49.1% relative humidity. 7 measurements were taken low along wall studs, giving 25, 20, 25, 25, 15, 25 and 22% moisture content. 7 measurements were taken high along wall studs, giving 21, 19, 25, 25, 25, 25 and 25%.

Moisture removal equipment was installed and allowed to run. On day 2, temperature was 65.1° F., 55.3% relative humidity. 7 measurements were taken low along wall studs, giving 20, 17, 25, 25, 20, 21 and 20% moisture content. 7 measurements were taken high along wall studs, giving 22, 18, 23, 23, 15, 21 and 20% moisture content. The moisture removal operation was continued, and then further measurements were taken on day 3. 6 lower level measurements of 20, 18, 18, 18, 15 and 21% moisture content were taken, and 7 upper level measurements of 18, 17, 20, 23, 18, 18 and 20% were recorded. Moisture removal was continued and on day 4, 7 measurements were taken at both lower and upper levels, resulting in: lower 18, 18, 18, 18, 15, 18, 17; and upper 16, 16, 17, 16, 18, 16, 15. The moisture removal operation was judged completed at this state.

EXAMPLE 3

New construction, 2300 square feet.

Day 1, temperature 63.2° F., 38.0% relative humidity. 7 measurements were taken low along wall studs, giving 15, 20, 15, 15, 30, 30, and 16% moisture content. 7 measurements were taken high along wall studs, giving 30, 30, 30, 18, 25, 24 and 20%.

Moisture removal equipment was installed and allowed to run until day 2, when further measurements are made, temperature was 80.2° F., 29.5% relative humidity. Measurements low along wall studs were 15, 15, 15, 15, 20, 15 and 16% moisture content. High location measurements were 25, 20, 25, 18, 23, 20 and 20% moisture content. The moisture removal operation was continued until day 3, when measurements as follows were judged to have sufficiently accomplished the desired moisture removal: low, 15, 15, 15, 15, 18, 15, 16%; and high 18, 17, 18, 18, 16, 15, 18%.

EXAMPLE 4

New construction, 1500 square feet.

Day 1, temperature 68.8° F., 43.0% relative humidity. 4 measurements were taken low along wall studs, giving 21, 18, 15 and 17% moisture content. 7 measurements were taken high along wall studs, giving 15, 25, 25, 21, 16, 15 and 18%.

Moisture removal equipment was installed and allowed to run. On day 2, when further measurements are made, temperature was 58.4° F., 59.4% relative humidity. Measurements low along wall studs were 18, 18, 15 and 17% moisture content. High location measurements were 15, 18, 18, 17, 16, 15 and 18% moisture content. This was sufficient moisture removal to complete the operation.

EXAMPLE 5

New construction, 2150 square feet.

Day 1, temperature 57.4° F., 97.4% relative humidity. 7 measurements were taken low along wall studs, giving 20, 15, 20, 21, 40, 18 and 16% moisture content. Measurements taken high along wall studs were 20, 20, 23, 40, 22, 17 and 30%.

Moisture removal equipment was installed and allowed to run until day 2, when further measurements are made, temperature was 67.0° F., 47.9% relative humidity. Measurements low along wall studs were 15, 15, 15, 15, 18, 18 and 16% moisture content. High location measurements were 15, 15, 18, 16, 15, 17 and 17% moisture content. This was a sufficient moisture level to complete the operation.

EXAMPLE 6

New construction, 2500 square feet.

Day 1, temperature 68.0° F., 36.6% relative humidity. 7 measurements were taken low along wall studs, giving 13, 11, 12, 11, 11, 13 and 10% moisture content. Measurements taken high along wall studs were 12, 11, 13, 10, 12, 13 and 11%.

Since all measurements were below the target level, no moisture removal was performed as the area was already at a sufficiently low moisture content.

In making measurements, any wood surfaces are measured, but typically moisture content measurements are made at base plates, studs and floors. It is not necessary to measure every stud in the structure, because if a stud with moisture content above the moisture threshold is detected in an area, then moisture removal will be performed in the area, so it isn't required to keep measuring at that point. Thus, for example, if the first set of measurements taken is beyond the acceptable moisture threshold, taking additional measurements is not necessary, but can be completed if desired, to provide historical data for comparison when the moisture removal is completed, and more measurements might be taken to further show overall moisture levels. Thus, in performing the process, typically moisture content tests are made throughout the structure, but moisture removal is only needed to be done in those areas where the moisture content level is too high.

Thus, in accordance with the system and method, a preventative moisture removal is accomplished to bring the moisture content level within a space to a desired level below that which would support mold growth, to reduce the likelihood that mold or moisture damage problems will arise in the finished construction. Should mold or moisture damage problems arise later, however, the builder has useful information to help locate the cause of the mold growth or moisture damage, as it is known from the use of the system and method that at a crucial point in the construction process, the moisture content level had been reduced sufficiently to prevent such growth or water damage. This information can help in determining what party might bear the responsibility for costs involved in mold or moisture damage remediation procedures. It can also assist in determining the construction stage at which a mold infestation or moisture entry took place.

While in the preferred embodiment, the moisture content level of 20% is a desired threshold, applied to Douglas fir wood, for example, below which the moisture content is desirably reduced, and while 18% was given as the threshold level in the illustrative examples herein, different levels may be appropriate in other types of wood and in other materials such as engineered woods (oriented strand board, plywood, fiberboard, etc.), wallboard or other materials.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A process for treating a space within a construction of a new home to prevent structural damage and/or the growth of mold or mildew, comprising the steps of:

measuring moisture content using a moisture meter at a plurality of locations within the space, wherein said plurality of locations include low and high locations of a plurality of exposed wall studs;

determining whether the measured moisture content meets a threshold indication recommending that drying be performed;

positioning and operating only within the space at least one drying device for the purpose of reducing the moisture level within the space and thereby reducing the moisture level in structural components of the space, wherein the at least one drying device is selected from the group consisting of a dehumidifier, a space heater, and an air moving device; and further comprising the step of substantially sealing off the space being treated with a vapor barrier relative to other space within said new home.

2. The process according to claim 1, wherein said at least one drying device is a dehumidifier and is operated for a period of time, whereupon one or more further moisture content readings are taken, and a decision is made whether to continue operating said dehumidifier based on whether said one or more further moisture content readings meet the threshold indication.

* * * * *